United States Patent
Hansen

(10) Patent No.: US 8,092,283 B2
(45) Date of Patent: Jan. 10, 2012

(54) METHOD OF PROCESSING FISH AND A FISH PROCESSING PLANT

(75) Inventor: Henning Ingemann Hansen, Odense (DK)

(73) Assignee: Cabinplant A/S, Haarby (DK)

( * ) Notice: Subject to any disclaimer, the term of this patent is extended or adjusted under 35 U.S.C. 154(b) by 0 days.

(21) Appl. No.: 13/123,447

(22) PCT Filed: Oct. 8, 2009

(86) PCT No.: PCT/EP2009/063094
§ 371 (c)(1),
(2), (4) Date: May 6, 2011

(87) PCT Pub. No.: WO2010/040802
PCT Pub. Date: Apr. 15, 2010

(65) Prior Publication Data
US 2011/0207388 A1 Aug. 25, 2011

(30) Foreign Application Priority Data
Oct. 9, 2008 (EP) .................................... 08388035

(51) Int. Cl.
*A22C 25/14* (2006.01)
(52) U.S. Cl. ...................................................... 452/121
(58) Field of Classification Search .................. 452/119, 452/125, 129, 149–154, 160–163, 166, 170, 452/177, 180, 182, 183
See application file for complete search history.

(56) References Cited

U.S. PATENT DOCUMENTS

| | | | |
|---|---|---|---|
| 4,551,885 A | 11/1985 | Molnar | |
| 4,601,083 A | 7/1986 | Shoji et al. | |
| 5,569,068 A * | 10/1996 | DeRoche et al. | 452/127 |
| 5,735,735 A * | 4/1998 | Hahn et al. | 452/119 |
| 6,183,356 B1 * | 2/2001 | Middleton et al. | 452/57 |
| 6,572,466 B1 * | 6/2003 | Del Ser Gonzalez | 452/127 |
| 7,056,202 B2 * | 6/2006 | Pein | 452/161 |
| 7,179,163 B1 * | 2/2007 | Vedsted et al. | 452/121 |

* cited by examiner

FOREIGN PATENT DOCUMENTS

| | | |
|---|---|---|
| WO | WO01/32025 | 5/2001 |
| WO | WO03/037090 | 5/2003 |
| WO | WO2007/138616 | 12/2007 |

OTHER PUBLICATIONS

International Search Report on related PCT application (PCT/EP2009/063094); International Searching Authority (EPO) dated Dec. 4, 2009.

*Primary Examiner* — Richard Price, Jr.
(74) *Attorney, Agent, or Firm* — Klein, O'Neill & Singh, LLP

(57) ABSTRACT

A system for processing fish of different anatomic constitution where the fish (22) having at least an end waste part (23, 24), a body part (26) and a transition (30) between the end waste part and the body part. The system comprising a frame including a fish loading area (18) for receiving the fish and a fish unloading area (52), an optical measurement unit (36) monitoring at least part of the fish loading area for producing a digital representation of the fish, a grabbing unit (40) mounted on the frame downstream in relation to the optical measurement unit for collecting the fish from the fish loading area and placing the fish on the fish unloading area, a processing unit for receiving the digital representation of the fish, determining the transition between the end waste part and the body part of the fish and a separation arrangement for separating the end waste part from the body part at the transition.

14 Claims, 6 Drawing Sheets

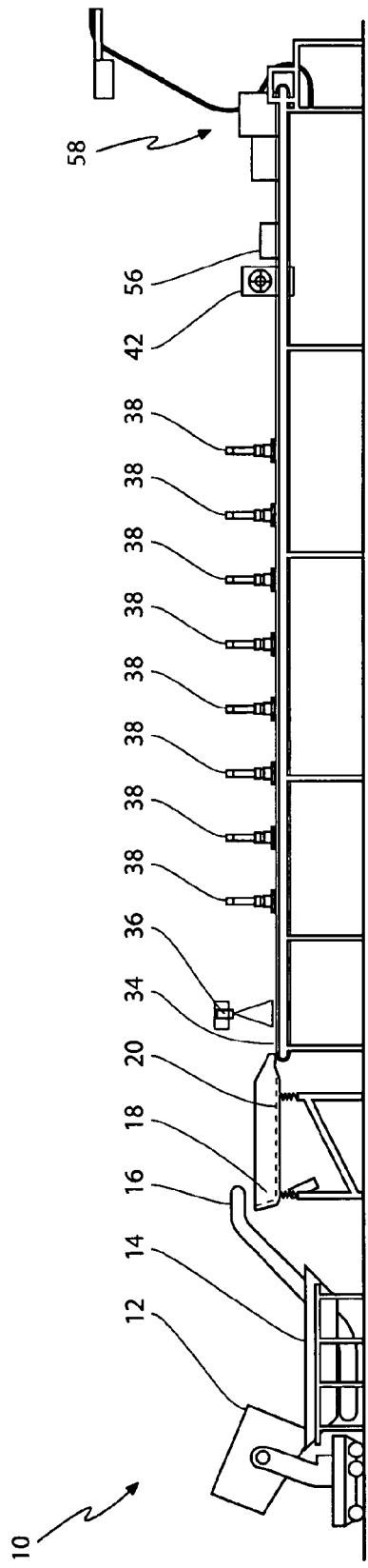
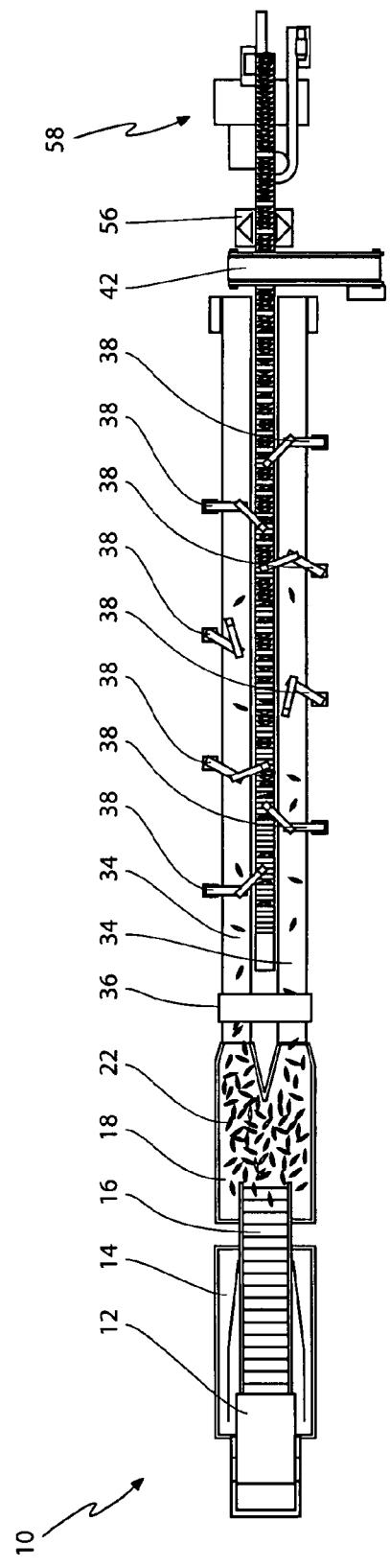
FIG 2A
FIG 2B

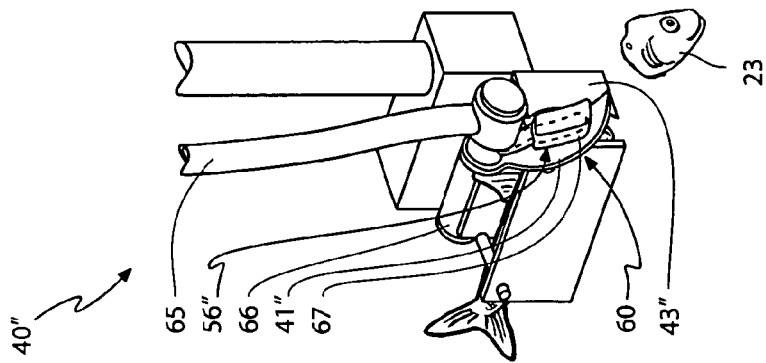
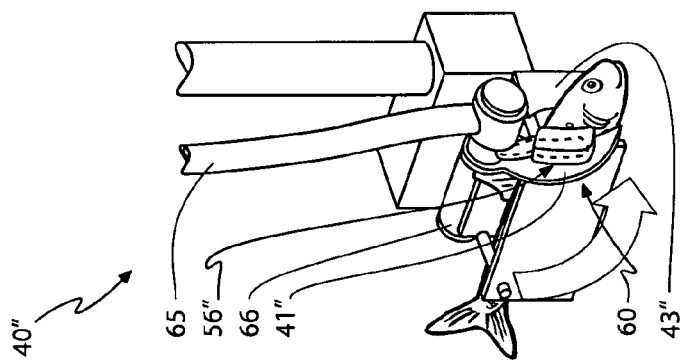
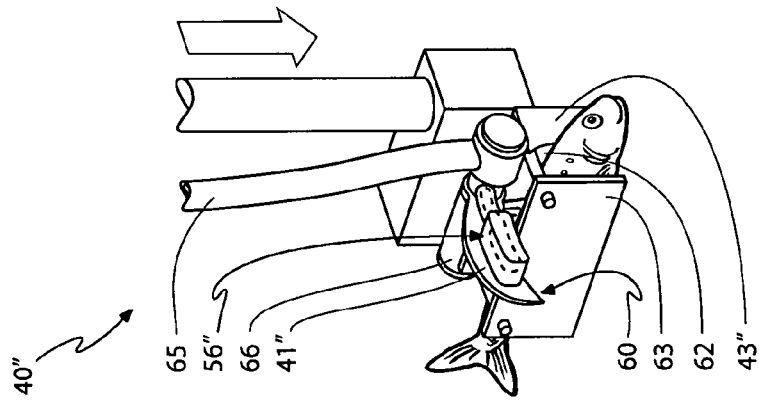
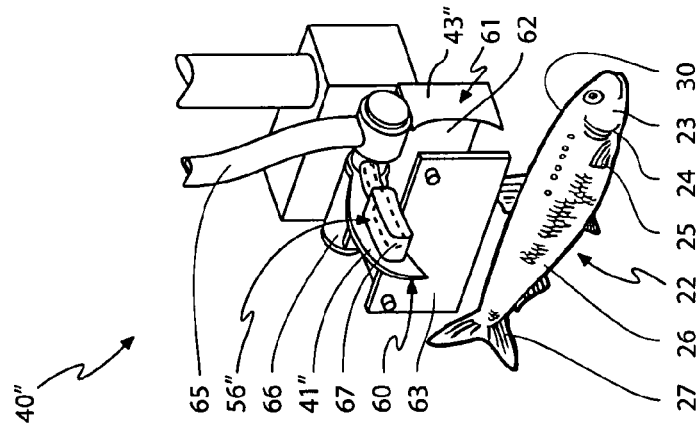

METHOD OF PROCESSING FISH AND A FISH PROCESSING PLANT

CROSS-REFERENCE TO RELATED APPLICATION

This application is a national phase filing, under 35 U.S.C. §371(c), of International Application No. PCT/EP2009/063094, filed Oct. 8, 2009, the disclosure of which is incorporated herein by reference in its entirety.

FEDERALLY SPONSORED RESEARCH OR DEVELOPMENT

Not Applicable

BACKGROUND

The present invention relates to a method and a system for processing fish, in particular sardines.

In the foodstuffs industry there is a need for automated processes for separating the non-consumable end waste parts of the fish from the consumable body part of the fish. The end waste parts may constitute the head, gills and tail of the fish. The present invention seeks to provide a system and a method for the above task.

Previous technologies, such as e.g. U.S. Pat. No. 4,551,885, typically provide a conveyer belt where the fish is placed in a specific position. Such specific position is typically determined by arranging the fish into a standardized compartment substantially corresponding to the anatomy of a standard fish or simply by arranging the fish against a fixed object, such as the wall or side of the conveyer belt. The conveyer belt transports the fish towards a fixed knife arrangement placed in a position suitable for decapitating a standard fish for which the arrangement was designed. The knife arrangement divides the fish into a head and gills part and a body part, where the tail belongs to the body part.

The drawback of the arrangement described above is evident, since it presumes that all fish to be processed are having exactly the same anatomy. However, even within a species of fish the size and in particular the position of the gills will differ significantly. To ensure no part of the head or gills remains with the body of the fish after decapitation, a substantial safety margin must be used when determining the position of the knife to allow for anatomic variations of the fish. The margin constitutes a loss since the meat remaining with the head and gills part of the fish after decapitation cannot be further processed and must be disposed or sold at a considerable lower price than the price of the meat in the body part of the fish. It has been estimated that in average approximately 10% of valuable fish meat remains with the head and gills part of the fish, since according to the fish anatomy the thickest part of the fish body and thereby the most meat is located near the gills. Consequently, even using a relatively small margin a relatively large amount of meat will be lost for further processing.

It would therefore be beneficial to have a process where each specific fish is cut in an optimal position in respect to the position of the gills of each specific fish. It is, however, very difficult to identify the position of the gills by an automatic process due to the smooth surface of the fish.

SUMMARY

It is, therefore, an object according to the present invention to provide a method and a system for automatically removing the end waste part, such as head, gills and tail, of different fish anatomies in an optimal and efficient way for each fish, and thereby minimize the loss of valuable fish meat in the fish body.

The above need and the above object together with numerous other objects and features will be evident from the below detailed description of an system according to a first aspect of the present invention for processing fish of a single species and of different anatomic constitution having at least an end waste part, a body part and a transition between the end waste part and the body part, the system comprising:

a frame, defining a first end and a second end opposite the first end and including a fish loading area for receiving the fish at the first end and a fish unloading area at the second end, an optical measurement unit located at the first end monitoring at least part of the fish loading area for producing a digital representation of the fish, a grabbing unit mounted on the frame downstream in relation to the optical measurement unit between the first end and the second end for collecting the fish from the fish loading area and placing the fish on the fish unloading area, a processing unit for receiving the digital representation of the fish, determining the transition between the end waste part and the body part of the fish and controlling the grabbing unit, and a separation arrangement located at or downstream in relation to the grabbing unit for separating the end waste part from the body part at the transition.

In the present context it has surprisingly been found out that by using modern computer technologies, robotics and digital camera technologies it would be possible to create the digital representation of the fish, calculate the optimal position for the transition between the end waste part and the body part of the fish and by using the grabbing unit manipulate the fish into the position where the fish may be separated into the end waste part and the body part by the separation arrangement. In the present context it may be contemplated that the end waste past may constitute a multitude of undesired parts of the fish, such as the head, tail, fin, gills etc. The optimal position for the transition between the head part and the body part in the present case is the position where the complete gills but no substantial amount of meat belongs to the head part. Consequently, the transition between the tail part and the body part may be calculated as the position where the complete tail, but no substantial amount of meat belongs to the tail part. It may be further contemplated that the body part of the fish may as well constitute a multitude of valuable meat parts of the fish, and that it in some circumstances may be advantageous to separate the body part into a multitude of meat parts.

The optimal position for the separation is determined from the digital representation by the use of the computer processor and suitable image processing software. The optimal position may preferably be determined in relation to a predefined coordinate system.

For the digital representation to be suitable for further processing by the computer processor and the image processing software, the fish should be placed at the loading area in a single layer having at least some amount of space between each fish.

To achieve the above requirement in an automatic process, the fish loading area preferably comprises a large flat surface or alternatively a water tank where the fish may be temporary stored in one layer. The computer processor and the image processing software may then be used to identify each fish for the grabbing unit to pick up the fish one by one.

The digital representation may preferably comprise a single 2D digital image of the fish. The 2D digital image may comprise a photo from a point where the gill cover and/or the pectoral fin are clearly visible. It may preferably be a point in the imaginary extension of the transition between the head part and the body part of the fish. The camera distance from the loading area should be chosen such that the whole width of the loading area is monitored for allowing a digital representation to be made for every fish present in the loading area.

The separation arrangement may be fixed to the processing plant for the fish to be transported towards the separation arrangement by e.g. the grabbing unit. Alternatively, the separation arrangement may be mobile, for, in a first step the fish to be placed in a specific position by the grabbing unit and in a second step the fish to be separated in a head part and a body part.

According to a first feature of the present invention the fish loading area and/or the fish unloading area may comprise a conveyor assembly. The conveyor assembly is preferably used to provide the fish to the optical measurement unit and grabbing unit in one layer and in a single row having at least some amount of space between each fish. The conveyor assembly may also be used after separation to transport the body part from the grabbing unit to a storage or further processing station. The conveyer assembly preferably comprises a conveyor belt. Alternatively, other conveyors may be used, such as a conveyor chain, a plurality of conveying compartments or a water channel. The separation arrangement may be located at the conveyer assembly at the second end and downstream in relation to the grabbing arrangement. The grabbing unit may reposition the fish on the conveyor for the fish to obtain an optimal position with respect to the knife arrangement following downstream in relation to the grabbing unit.

According to a second feature of the present invention the conveyer assembly has a variable conveying velocity. A variable conveying velocity will ensure an optimal usage of the grabbing unit and eliminates the risk of overloading the grabbing unit. Overloading the grabbing unit will cause some fish to be missed and not collected by the grabbing unit.

According to a further feature of the present invention the conveyer assembly may comprise a first and a second conveyer wherein the first conveyer and the second conveyer extending parallel for at least part of the distance between the first end and the second end. For more efficient usage of factory space, the conveyor assembly preferably comprises a conveyor system extending in 2 dimensions or more preferably in 3 dimensions, e.g. by the use of parallel flat and/or overhead/multilevel conveyors. For the purpose of elevating the fish to an overhead conveyor a compartmenterized conveyor is preferably used, such as e.g. a bulk elevator. In this context preferably the first conveyer delivers the fish to the grabbing unit and the second conveyer transports the fish onwards.

According to a further feature of the present invention the first conveyer and the second conveyer may have an opposite conveying direction for at least part of the distance between the first end and the second end. For more efficient packing and sorting of the fish, the delivery conveyer and the onwards conveyor may have opposite directions. In some embodiments the second conveyer have packing containers, packing compartments or similar for direct weighing and packaging. Alternatively, the fish is packaged directly when leaving with the second conveyer. Oppositely oriented conveying direction of the first and second conveyer will ensure that all packing containers have substantially the same amount or mass of fish, since the almost filled fish containers will be filled from an almost filled delivery container and the empty fish containers will be filled from an almost empty delivery container. This way the greatest choice of different fish sizes will be available when a specific amount of fish weight is needed.

According to a further feature of the present invention the body part have a length longer than a specific maximum length and the separation arrangement separates the body part into a first body part having a length equal to the maximum length and a second body part having a length equal to the specific length minus the maximum length. This way fish too long to fit in a specific packing container or conveyor is cut a second time to fit. The remaining pieces of the body may be used to fill containers having a weight just below the minimum weight. This way the container may be filled more accurately with respect to weight.

According to a further feature of the present invention, the separation arrangement may be fixed onto the grabbing unit. Having the separation arrangement fixed onto the grabbing unit will thus form a grabbing unit with an integrated separation arrangement. The grabbing unit should be grabbing the fish body part in an optimal position such that the separation arrangement is located at the transition between the end waste part of the fish and the body part of the fish or alternatively the separation arrangement may be flexibly attached to the grabbing unit such that it can move to the transition between the end waste part and the body part by itself. By activating the separation arrangement, the end waste part of the fish is separated from the body part of the fish at the transition between the end waste part of the fish and the body part of the fish. The grabbing unit may then place the end waste part of the fish and the body part of the fish separately at the unloading area. Alternatively, the end waste part is immediately disposed, e.g. by a suction device or by dropping the end waste part onto a waste container/conveyor. The body part may alternatively be directly packed in a packaging container or the like.

According to a further feature of the present invention the optical measurement unit may comprise a CCD camera or alternatively a laser tracking system. The CCD camera or alternatively the laser tracking system may preferably be used for creating the digital representation. It may be a black and white CCD camera or alternatively a colour CCD camera depending on the specific characteristics of the species of fish to be processed.

According to a further feature of the present invention the grabbing unit may comprise one or more industrial robots. The grabbing unit may preferably comprise a commercially available industrial robot such as a Flexpicker™. It may further be a single robot or a system comprising a plurality of robots.

According to a further feature of the present invention the grabbing unit may comprise an electromechanical or pneumatic gripping member or alternatively a suction member for moving the fish. The grabbing unit should be designed to grab the fish without damaging the fish in any way such as crushing the fish, dismembering the fish or leaving clearly visible marks on the fish. The grabbing unit may have an end effector or gripping member such as e.g. a claw or jaw for physically grabbing the fish. Alternatively, the grabbing unit may comprise a suction member, i.e. by the use of subatmospheric pressure the fish may be temporarily attached to an end effector of the grabbing unit firmly enough to allow for movement of the fish without causing any damage to the fish.

According to a further feature of the present invention the separation arrangement may comprise a rotating circular knife or alternatively a reciprocating elongated knife.

According to a further feature of the present invention there may further be provided one or more additional processing stations such as an evisceration station or a packing station. Such additional processing stations may preferably follow downstream in relation to the separation arrangement, or alternatively be a part of the separation arrangement.

According to a further feature of the present invention there may further be provided one or more additional unloading areas such as a reject station or a waste station for disposing the end waste part. After separation the end waste part and the body part are preferably deposited at different locations. The grabbing unit may e.g. transport/drop the end waste part into a waste container and the body part to a packaging container, or alternatively a conveyer may be used for the transport.

According to a further feature of the present invention the processing unit may include means for determining the transition between the end waste part and the body part by measuring the overall length of the fish and calculating a fraction of the overall length corresponding to the length of the end waste part. For some species of fish the transition between the body part and the end waste part may correlate strongly with the size of the fish, such that the position of the transition may be calculated as a fraction of the size of the fish.

According to a further feature of the present invention the processing unit is supplied with a list of size groups constituting size ranges, the fish is designated into one size group determined by measuring the overall length of the fish and the transition between the end waste part and the body part is determined by the size group. The hardware or software may limit the available separation positions on the fish to a discrete number. In such a case the fish may be divided into size groups, where each size group encompass a certain size range and where all fish designated to a specific size group are separated at the same position.

According to a further feature of the present invention there may further be provided a packing station, the packing station providing a multitude of containers for receiving the fish, the multitude of containers are designated different size ranges, the fish is packed in the corresponding container according to the size of the fish, which is derived from the digital representation. Since it is desired that all of the containers have a substantially equal mass, it is contemplated that the number of fish in each container differs, as the mass of each fish differs. The mass of each fish may be at least roughly determined from the digital representation. Thereby, it can be assured that the total mass of each container is substantially the same. For the aesthietic appearance of the beverage container it may be beneficial to place fish of approximately the same size in the same container. This implies that each container may either include a small number of large fish, or a large number of small fish. E.g. a randomly chosen container may include 2 fishes of very large size, or alternatively 3 fishes of large size, or yet alternatively 5 fishes of medium size, or yet alternatively 7 fishes of small size, or yet alternatively 12 fishes of very small size. For some embodiments it may be contemplated that a large fishes may be cut into several small pieces, each corresponding to one small fish, for each container to include the same number of substantially equal sized fish.

According to a further feature of the present invention the end waste part may comprise a head part, i.e. the head and the gills of the fish.

According to a further feature of the present invention the processing unit may include means for determining the transition between the head part and the body part by the position of the gill cover or alternatively the position of the pectoral fin or alternatively by the surface area of the fish or alternatively by the circumference of the fish or alternatively by the colour of the fish or alternatively by the length of the fish or alternatively by the contour/outer periphery of the fish. For some species of fish the gill cover may be clearly visible and therefore determinable from the digital representation. In such a case it would be possible to make a digital representation of the fish including the gill cover and by the use of a computer, i.e. image processing software running on a processing unit, determine the position of the gill cover. For another species of fish the gill cover may not be visible or determinable by the use of a computer. In such a case the position of the gill may correlate with the position of the pectoral fin, which may be easier to visually detect and determine by the use of a computer. Other feasible alternatives applicable for some species of fish may include determining the transition between the end waste part and the body part by a variation in colour of the surface of the fish, or alternatively by measuring the surface area or circumference of the fish and from this information derive the approximate position of the transition between the end waste part and the body part of the fish.

According to a further feature of the present invention the end waste part may comprise the tail part of the fish.

According to a further feature of the present invention the processing unit may include means for determining the transition between the tail part and the body part by the position of the thinnest part of the fish. In a typical fish anatomy the tail part and the body part is separated by a thin transition. This transition may be detectable by a digital camera.

The above need and the above object together with numerous other objects and features will be evident from the below detailed description of a processing station according to a second aspect according to the present invention for processing fish of a single species and of different anatomic constitution having at least an end waste part, a body part and a transition between the end waste part and the body part, the processing station constituting a combined grabbing unit, separation unit and evisceration unit where:

- the grabbing unit comprising a first surface and an opposite located second surface, the first and second surfaces being movable relative to one another, the first and second surfaces defining an enclosure for accommodating the fish body, the enclosure having an open end for exposing the transition between the end waste part and the body part,
- the separation unit being located at the open end of the enclosure and comprising a set of separating elements, the set of separating elements defining an open position defining a distance between the set of separating elements for accommodating the transition, and a closed position where the set of separating elements are contacting each other, and
- the evisceration unit comprising a suction unit for subjecting the transition to a low pressure, the evisceration unit having an active position where the suction unit is positioned juxtaposed the open end, and a passive position where the suction unit is positioned remote from the open end.

The grabbing unit is preferably controlled by a processing unit and an optical measurement unit as described in connection with the first aspect of the present invention. Fish may be provided to the processing station by a conveyor or the like for the grabbing unit to position the fish between the first and second surfaces. The first and second surfaces may preferably be metal plates or alternatively a claw or similar. The moving surfaces will simplify the grabbing of the fish as well as providing a more stable positioning of the fish during severing and evisceration. The first and second surfaces should keep the fish positioned such that the transition is positioned between the separation elements when the separation elements are in the open position. When the separation elements are moved towards the closed position the transition will be severed and the body part of the fish will be separated from the end waste part of the fish.

The separation elements may constitute a mobile knife and a fixed knife, or alternatively two mobile knives, operating reciprocally in relation to each other and optionally having a rotational movement.

After severing the fish, the evisceration unit may move from the passive position to the active position such that the suction unit is located juxtaposed the transition for removing the guts of the fish. The grabbing unit may then proceed to another fish and before grabbing another fish restoring the mobile knife to the open position and the evisceration unit to the passive position. The above system may be used for the head part or the tail part or both the head and tail part of the fish.

According to a further feature of the present invention the suction unit is mounted on the mobile knife and where the open position corresponds to the passive position and the closed position corresponds to the active position. By combining the mobile knife and the suction unit the severing and the evisceration may be performed in one single motion.

According to a further feature of the present invention the first and second surfaces are undulated. Undulated surfaces will provide a more secure positioning, due to the undulated body according the fish anatomy.

The above need and the above object together with numerous other objects and features will be evident from the below detailed description of a method according to a third aspect according to the present invention for processing fish of a single species and of different anatomic constitution having at least an end waste part, a body part and a transition between the end waste part and the body part, the method comprising:
   providing a frame, defining a first end and a second end opposite the first end and including a fish loading area at the first end and a fish unloading area at the second end,
   providing an optical measurement unit located at the first end monitoring at least part of the fish loading area for producing a digital representation of the fish,
   providing a grabbing unit mounted on the frame downstream in relation to the optical measurement unit between the first end and the second end for collecting the fish from the fish loading area and placing the fish on the fish unloading area,
   providing a processing unit for receiving the digital representation of the fish and controlling the grabbing unit, and
   providing a separation arrangement located at or downstream in relation to the grabbing unit for separating the end waste part from the body part at the transition,
processing the fish by performing the following steps:
   placing the fish on the fish loading area,
   determining the transition between the end waste part and the body part of the fish by using the processing unit,
   collecting the fish by using the grabbing unit controlled by the processing unit, and
   separating the end waste part from the body part at the transition.

According to the teachings of the present invention the method according to the third aspect of the present invention described above may further include any of the features of the previously described system for processing fish.

The above need and the above object together with numerous other objects and features will be evident from the below detailed description of a processing method according to a fourth aspect according to the present invention for processing fish of a single species and of different anatomic constitution having at least an end waste part, a body part and a transition between the end waste part and the body part, the processing method comprise providing a processing station constituting a combined grabbing unit, separation unit and evisceration unit where:
   the grabbing unit comprising a first surface and an opposite located second surface, the first and second surfaces being movable relative to one another, the first and second surfaces defining an enclosure and the enclosure having an open end,
   the separation unit being located at the open end of the enclosure and comprising a set of separating elements, the set of separating elements defining an open position defining a distance between the set of separating elements for accommodating the transition, and a closed position where the set of separating elements is severing said transition, and
   the evisceration unit comprising a suction unit and having an active position where the suction unit is positioned juxtaposed the open end, and a passive position where the suction unit is positioned remote from the open end, the processing method further comprise the steps of:
   accommodating the fish body in the enclosure defined between the first and second surfaces and exposing the transition between the end waste part and the body part at the open end of the enclosure while having the separation unit in the open position and the evisceration unit in the passive position, and
   Severing and eviscerating the fish by moving the separating element to the closed position and subsequently, or alternatively simultaneously, moving the evisceration unit to the active position and subjecting the transition to a low pressure.

BRIEF DESCRIPTION OF THE DRAWINGS

It is evident that numerous variations of the systems and methods described above may be contemplated. The invention will now be further described with reference to the figures, where:

FIG. 2*a-b* is a side and top view, respectively, of a first embodiment of a processing plant according to the present invention, FIG. 5*a-d* is a perspective view of a first embodiment of an end effector according to the present invention.

DETAILED DESCRIPTION

A detailed description of the figures of some specific embodiments of the invention follows below.

Figure 1:
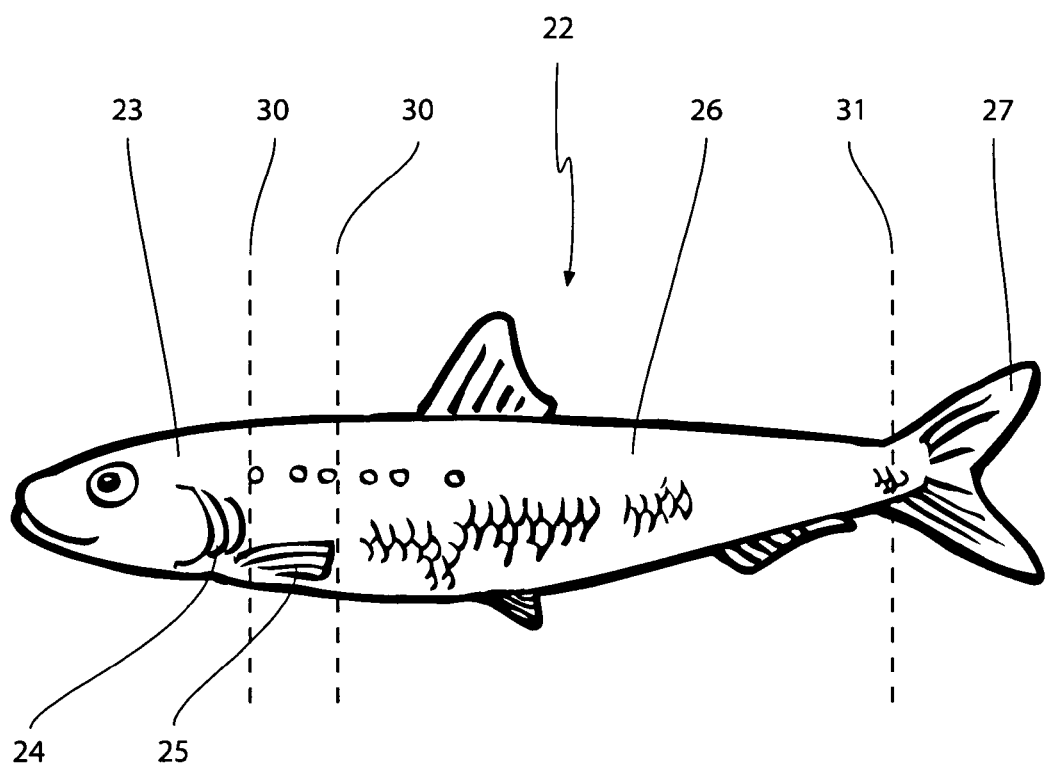
FIG. 1 is a basic anatomy of a fish.

FIG. 1 shows the typical anatomic features of a fish belonging to the sardine group 22. It comprises a head part 23, a body part 26 and a tail part 27. A pair of gills 24 and a pair of pectoral fins 25 are located at the transition between the head part 23 and the body part, indicated by a dashed line and denoted 30. The thinnest part of the fish is typically located at the transition between the tail part 27 and the body part 26, indicated by a further dashed line and denoted 31. The head part 23 including the gills 24 and pectoral fins 25, together with the tail part 26, is commonly referred to as end waste parts, since they do not contain any substantial amount of meat and may consequently be disposed. The body part 26 is the highly valuable consumable meat part of the fish. If the pectoral fin 25 is not desired, the fish may have to be separated at 30'.

FIG. 2a shows a side view of a first embodiment of a sardine processing plant 10. Sardines 22 may preferably be delivered to the processing plant 10 in bulk container 12. The sardines 22 may be delivered to the sardine processing plant 10 either in a substantially fresh state, e.g. from a fishing boat or tank, or alternatively in a substantially frozen state, e.g. from a freezer or cold storage. The content of the bulk container 12 is tipped into a bulk receptacle 14. The sardines are further conveyed into a first end of a loading area 18 by a bulk elevator 16. The loading area 18 may preferably comprise a thawing and salting arrangement, e.g. an elongated container filled with saline water, preferably water of moderately to high salinity, and a submerged and at least partially uneven or toothed underwater conveyer 20. The sardines 22 having a specific density lower than the specific density of the saline water will be conveyed towards the second end of the loading area in a partially submerged position at the surface of the saline water. The bulk elevator 14 should be set to deliver the sardines into the thawing and salting arrangement 30 at a rate such that not more than one layer of sardines is formed on the surface of the saline water.

FIG. 2b shows a top view of the first embodiments of a sardine processing plant 10. Two parallel transport bands 34 are located at the second end of the loading area 18. Both transport bands 34, being a certain distance apart, extent into and below the surface of the saline water and have a first end comprising a sprocket wheel completely submerged in the saline water. The sardines 22, remaining in a partially submerged position and in one layer will be collected by one of the two parallel transport bands 34. A digital representation of each sardine 22 is made by a camera detection unit 36. The digital representation is fed to a set of robots 38, which positions the sardine 22 in an optimal position in relation to a separation arrangement 42 following downstream in relation to the robots 38. Further downstream the sardines 22 are eviscerated by a evisceration station 56 and packaged in a packing station 58 The subsequent special features of two separate embodiments of a fish processing plant will be further described by the following FIG. 3 and FIG. 4.

Figure 3:
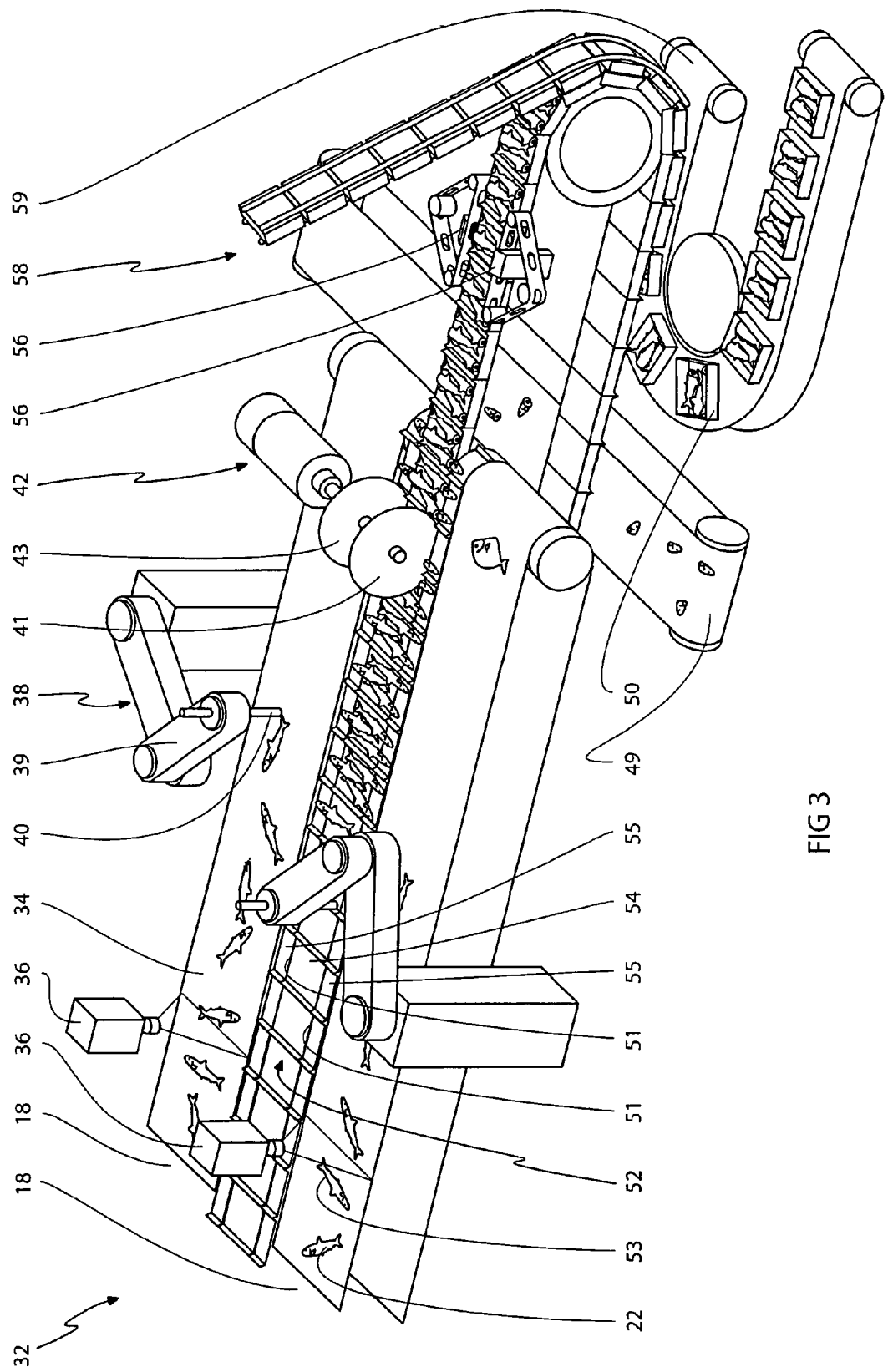
FIG. 3 is a perspective view of a second embodiment of a processing plant according to the present invention.

FIG. 3 shows a close-up perspective view of a second embodiment of a processing plant 32 for sardines. A sardine 22 may enter the processing plant 32 at a loading area 18 located upstream. At the loading area 18 the sardines 22 are placed on a transport band 34. The sardine 22 may be placed on the transport band 34 in any permitted orientation provided that all parts of the sardine 22 are located within the limits of the transport band 34 and that the sardine 22 is not overlapping or being overlapped by another sardine or other object. Preferably at least some amount of space is available between the sardine 22 and any other sardine or other object. The permitted orientation should be understood to mean any position where one gill cover of the sardine 22 is facing the transport band 34 and the other gill cover of the sardine 22 is facing the opposite (upwards) direction.

Downstream in relation to the loading area 18 the transport band 34 passes a camera detection unit 36 comprising a CCD camera. The camera detection unit 36 creates a digital representation, e.g. a digital photo of each sardine 22 and communicates the digital representation to a computer (not shown). The computer (not shown) calculates data such as size, position, orientation and location of the transition between the body part and the end waste part of the sardine 22 passing on the transport band 34. A robot 38 is placed and has its working envelope downstream in relation to the camera detection unit 36. The robot 38 may e.g. be of the type Flexpicker™. The computer (not shown), controls the robot 38. The computer (not shown) additionally has information about the velocity of the transport band 34 and determines when the sardine 22 is within reach of the robot 38. The robot 38 comprises a robot arm 39 and an end effector 40 at the end of the robot arm 39. The robot 38 collects the sardine 22 by either fastening the sardine 22 mechanically between two end effectors 40 or alternatively by fastening the sardine 22 to one end effector 40 by suction principle. The end effector 40 should be applied near the presumed centre of gravity of the sardine 22 for optimal stability. The end effector may lift the sardine 22 a small distance above the transport band 34 and move the sardine to a packing conveyor 52. The packing conveyor 52 is divided into compartments separated by a low compartment wall 53. The packing conveyor 52 further comprises two parallel slits 51 in the longitudinal direction of the packing conveyor 52. Each compartment is further separated into a centrally located body compartment 54 and two end compartments 55 for the waste end parts. The sardine 22 is placed on the packing conveyor 52 between the compartment walls 53 such that the body part of the sardine 22 is located inside the body compartment 54 and the end waste part constituting the head is located inside one of the end compartments 55 and the transition between the body part and the head part of the sardine 22 is coinciding with one of the slits 51. Preferably the sardines 22 are packed in the compartment in the opposite orientation in relation to the neighboring sardine. In the current embodiment it is not possible for both the head part 23 and the tail part 27 to be optimally placed in the end waste compartments 55 (except for one single fish anatomy). Therefore, the current embodiment is preferably used when it is desired to keep the tail part of the sardine 22 with the body part of the sardine 22 after packaging. Thus the head part 23 is to be placed optimally. Hence, no measurement of the tail part 27 is necessary in the current embodiment. Each compartment is filled with 5-10 sardines 22. For optimal packing the sardines are placed with alternating orientation referring to head and tail placement.

A separation arrangement 42 is located downstream in relation to the robot 38. The separation arrangement comprises two circular knives 41, 43, each knife operating into a separate slit 51 separating the body compartment 54 and the end compartments 55. As the sardine 22 proceeds on the packing conveyer 52, the head part and the body part of the sardine 22 are separated by the rotating knives 41, 43.

The end compartments 55 release the end waste parts of the sardine 22 onto a waste conveyor 49 located downstream in relation to the separation arrangement 42. The end waste parts are subsequently collected for disposal. The body compartment 54 proceeds to an evisceration station 56. The evisceration station 56 comprises a vacuum suction device for removing the guts of the sardine 22.

Following downstream the evisceration station is a packing station 58, where the body parts of the sardine are released into a can 50. The can 50 is placed on a container conveyor 62 and proceeds to shipping.

Figure 4:
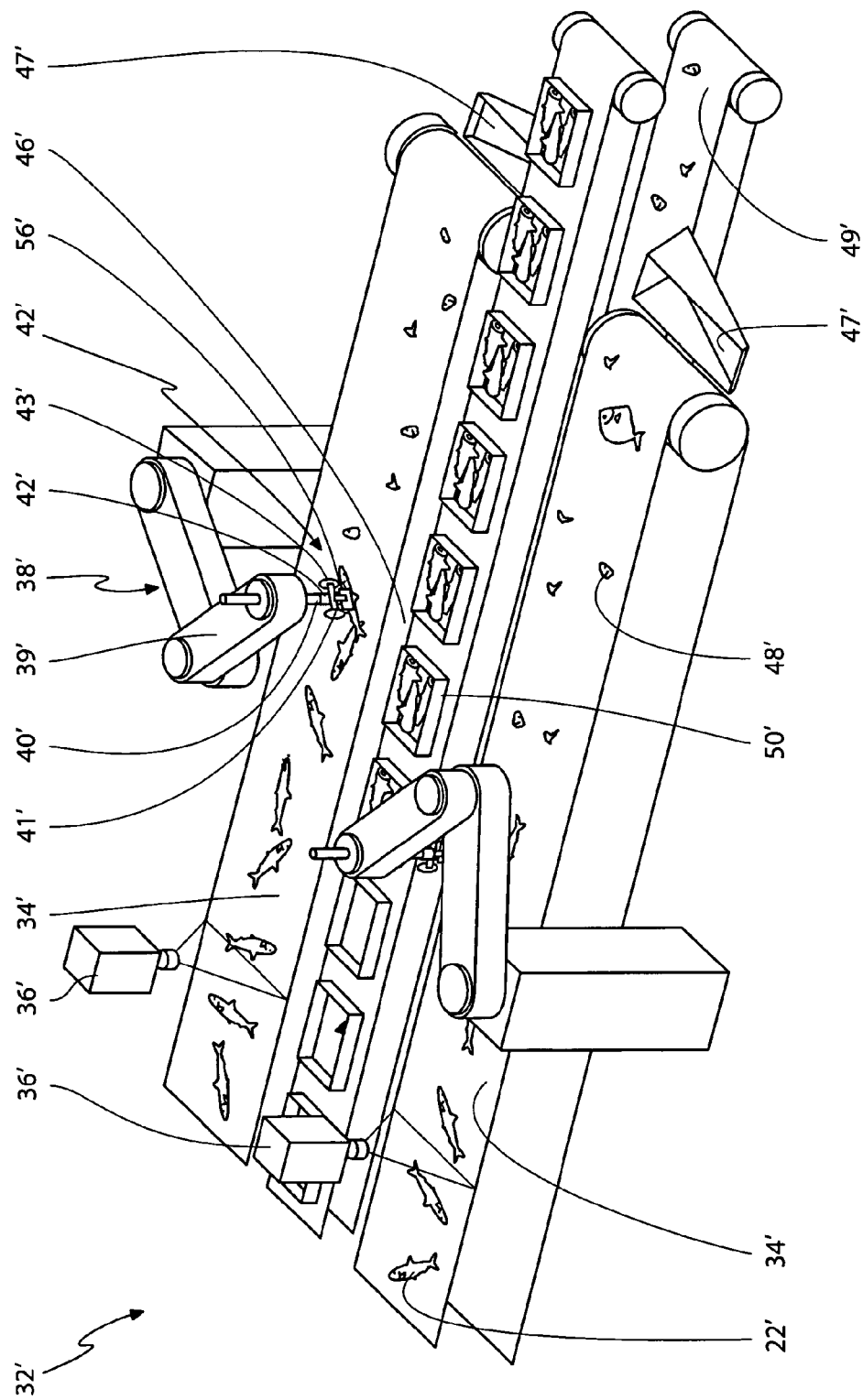
FIG. 4 is a perspective view of a third embodiment of a processing plant according to the present invention.

FIG. 4 shows a close-up perspective view of a third and presently most preferred embodiment of a processing plant for sardines 32'. A sardine 22' may enter the processing plant 32' placed on a transport band 34'. The sardine 22' may be placed on the transport band 34' in any permitted orientation where all parts of the sardine 22' is located within the limits of the transport band 34', the sardine is not overlapping or being overlapped by another object and at least some amount of space is available between the sardine 22' and any other object or sardine. The permitted position should be understood to mean any position where one gill cover is facing the transport band 34' and the other gill cover is facing the opposite (upwards) direction.

The transport band travels in the direction of the arrow. At the beginning the transport band 34 passes a camera detection unit 36' comprising a CCD camera. The camera detection unit 36' creates a digital representation of the sardine 34' and communicates the digital representation to a computer (not shown). The computer (not shown) calculates data such as size, position, orientation and location of the transition between the body part and the end waste part of the sardine 22' passing on the transport band 34'. A robot 38' is placed and has its working envelope downstream in relation to the camera detection unit 36'. The robot 38' may e.g. be of the type Flexpicker™. The computer (not shown) controls the robot 38'. The computer (not shown) additionally has information about the velocity of the transport band 34' and determines when the sardine 22' is within reach of the robot 38'. The robot 38' comprises a robot arm 39' and an end effector 40' at the end of the robot arm 39'. The robot 38' collects the sardine 22' by either fastening the sardine 22' mechanically between two end effectors 40' or alternatively by fastening the sardine 22' onto one end effector 40' by suction principle. The end effector 40' should be applied near the presumed centre of gravity of the sardine 22' for optimal stability. The end effector may lift the sardine 22' a small distance above the transport band 34' and reorient the sardine 22' such that it is located directly under a separation arrangement 42'.

The separation arrangement 42' is fixated to the robot arm 39' near the end effector 40', and comprises two rotating circular knives where the first knife 41' is used for separating the head part of the sardine 22' from the body part of the sardine 22' and the second knife 43' is used for separating the tail part of the sardine 22' from the body part of the sardine 22'. The first knife 41' and the second knife 43' are adjustable with respect to the distance from the end effector 40'. The first knife 41' may move to a position just above the transition between the body part of the sardine 22' and the head part 23 of the sardine 22' and the second knife 43' may move to a position just above the transition between the body part of the sardine 22' and the tail part of the sardine 22'. The sardine 22' is severed either by using the end effector 39' to lift the sardine 22' into contact with the cutting arrangement 42' or alternatively by lowering the cutting arrangement 42' into contact with the sardine 22'. The above configuration is used for minimizing waste. The second knife 41' is alternatively used to separate the tail part and the body part of the sardine 22' at a fixed position in relation to the first knife 43' when there is a need for a standardized size of the sardine 22'. If the tail part of the sardine 22' is desirable the second knife 41' may be omitted.

An evisceration arrangement 56 may be provided fixated to the robot 38' above the separation arrangement 42'. The evisceration arrangement comprises a vacuum suction device for removing the guts of the sardine 22'. By lifting the sardine a small distance the severed end of the body of the sardine 22' where the head of the sardine 22' was attached to the body of the sardine 22' prior to separation may be put in contact with the suction device and the guts of the sardine 22' may be removed by applying suction.

A waste receptacle 46' is located parallel with respect to the transport band 34' for collecting the severed end waste parts of the sardine 22', which will fall off during separation. The transport band 34' has a second end after passing the robot 38'. At the second end an end waste receptacle 44' is provided for receiving waste objects 48' not picked up by the robot 38'. Such waste object 48' may be fish belonging to an undesired species or sardines 22' having an unsuitable size, e.g. being too small or too large or not fitting into any predefined size group. Waste objects 48' are detected by the optical measurement unit 36' as such and are allowed to pass the robot 38' without being collected.

The transport bands 34' may preferably have a variable velocity controlled by the computer to allow for an efficient utilization of the robot 38'.

After separation the sardine 22' is placed in a can 50' located on a packing conveyer 52'. Typically, each can 50' is filled with 5-10 sardines 22'. The cans 50' preferably are filled such that the weight of each can is standardized. This may be reached by either weighting each fish by including a weight sensor in the end effector 40' of the robot 38' or by measuring the weight of the can 50' when filled at the packing conveyor 52'. Alternatively, the cans 50' may be filled with a constant number of sardines 22', such as 7, and afterwards weighed. Cans 50' falling within a specified weight range may proceed to shipping, whereas overweighed or underweighted cans 50' falling outside the size range proceed to a manual equalisation station (not shown) where one or more sardines 22' are removed from the overweighed cans 50' and added to the underweighted cans 50'.

FIG. 5a-d shows a series describing the severing of the head part 23 and the body part 26 of a sardine 22. It should be noted that the separation of the head part 23 is shown here, however, the tail part 27 may be separated in a similar way which will be evident to a skilled person in the art.

FIG. 5a shows an end effector 40" according to the present invention and constituting a processing station comprising a severing arm 60, a gripping unit 61 and an evisceration station 56". The gripping unit 61 comprises an inner plate 62 and an outer plate 63. The inner and outer plates 62, 63 are parallel and are having an in-between distance for accommodating the body part 26. The outer plate 63 is movable in direction towards the inner plate 62 for gripping and releasing the body part 26. The outer plate 63 is attached to the inner plate 62 and the rest of the gripping unit 61 by two actuator rods 64 located near the upper end of the plates 62, 63. The actuator rods 64 comprise electromechanical actuators for moving the outer plate 63. The inner plate 62 has a fixed knife 43" attached. The fixed knife 43" is oriented towards the outer plate 63, i.e. perpendicular in relation to the inner and outer plates 62, 63. The severing arm 60 is mounted above and outside the inner and outer plate and is pivotable in direction towards the fixed knife 43". The severing arm 60 is connected to an electric motor 66.

The severing arm 60 constitutes a combined mobile knife 41" and an evisceration station 56". The evisceration station 56" comprises a suction member 67 fixed in a juxtaposed position on the side of the mobile knife 41". The mobile knife 41" defines a hole through which the suction member 67 of the evisceration station 56" may communicate. The evisceration station 56" is further connected to a hose 65 for providing a low pressure and for transporting the guts of the sardine to a waste receptacle (not shown).

FIG. 5b shows the end effector 40' after gripping the sardine 22 between the inner and outer plate 62, 63. The end effector 40' is attached to an industrial robot or the like not shown but described above in connection with FIGS. 2-4 and the end effector 40' is thus movable in three dimensions within its working envelop. The sardine 22 is gripped between the inner and outer plates 62, 63 by lowering the end effector 40' onto the sardine in a specific position determined by the processing unit and optical measurement unit (both not shown here) and subsequently moving the outer plate 63 towards the inner plate 62 for fixating the body part 26. The specific position is contemplated to be the position where the transition 30 between the head part 23 and the body part 26 is located between the fixed knife and the mobile knife. The specific position is also contemplated to be a position where the fish body is fixated between the inner and outer plates 62 63. The sardine 40' is provided on a transport band (not shown) as described in connection with FIGS. 2-4. The fixation force between the inner and outer plates 62, 63 also allow lifting of the sardine 22.

FIG. 5c shows the severing arm 60 pivoting towards the fixed knife 43" and the sardine 22. The severing arm 60 is propelled by the electric motor 66. When the mobile knife 41" reaches the transition 30 between the head part 23 and the body part 26 of the sardine 22 the sardine 22 will be squeezed and severed from two opposite direction by the mobile knife 41" and the fixed knife 43".

FIG. 5d shows the severing arm 60 in its end position when the mobile knife 41" has reached and contacted the fixed knife 43". The knives 41", 43" are preferably slightly offset in order to operate in the same principle as a pair of scissors, which will assure a reliable severing.

The severing is preferably made above a receptacle for collecting the end waste parts of the sardine 22. The sardine may thus be lifted and move to such position before the severing takes place.

When the severing arm 60 has reached its end position the suction member 67 will be positioned juxtaposed the body part 26 of the sardine 22, i.e. juxtaposed the transition between the head part 23 and the body part 26 of the sardine 22. In the present position the suction member 67 may begin removing the guts of the sardine 22 by suction. When the guts of the sardine 22 has been removed, the severing arm 60 may pivot back to its starting position and the end effector 40' may be lifted and moved to the next sardine.

Figure 6:
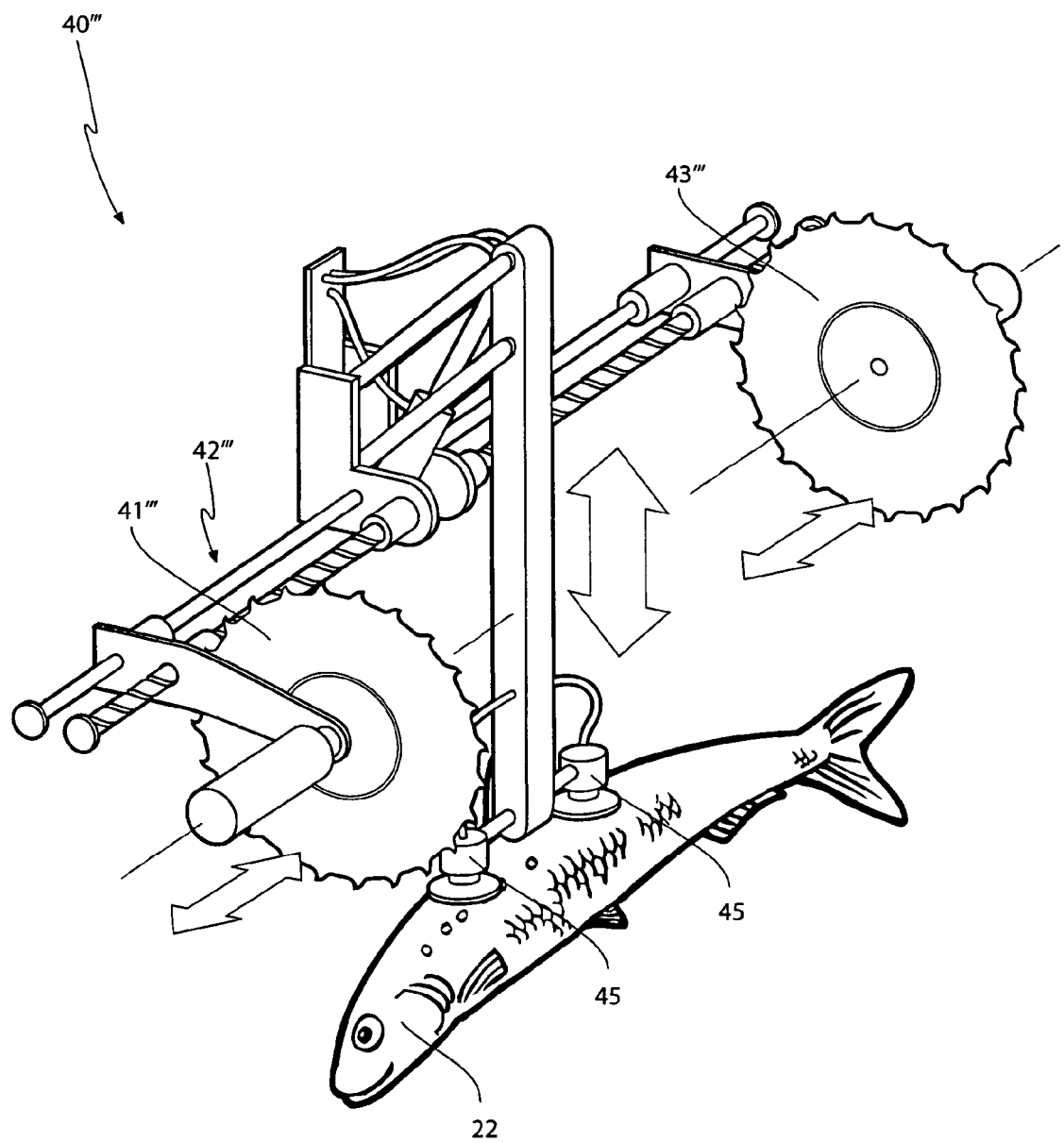
FIG. 6 is a perspective view of a second embodiment of an end effector according to the present invention.

FIG. 6 shows an alternative embodiment of an end effector 40'''. The end effector 40''' comprises a suction element 45 for attaching to the sardine 22. The suction element 45 is attached to a lifting rod 68, which may be elevated by a lifting actuator 69. The suction member 45, and thereby the sardine 22 may be collected while the lifting rod is in a low position. The end effector 40''' further comprises a separation arrangement 42''' having first rotating knife 41''' and a second rotating knife 43'''. The rotating knives 41''', 43''' may be shifted in the longitudinal direction as shown by the arrows by the use of a spindle 70. This allows the knives 41''', 43''' to be positioned at the transition between the head part of the sardine 22 and the end waste part of the sardine 22. The suction element 45 may be lifted according to the arrow to a high position so that the sardine 22 comes into contact with the rotating knives 41''', 43''' for severing the head part of the sardine 22 and the tail part of the sardine 22 from the body part of the sardine 22. The rotating knives 41''', 43''' are powered by a motor 71.

The embodiments in FIGS. 3 and 4 are shown with two parallel transport bands 34' and two robots 38' situated around a single centrally located packing conveyer 52'. It has been shown that this configuration makes more efficient usage of the transport conveyer 52'.

The decapitated and eviscerated sardine may subsequently be further processed according to the wish of the customer. Such further processing may involve packing in containers, cooking, freezing etc.

A variety of motors or motion generating devices such as e.g. pneumatic, electric or hydraulic devices may drive the transport bands, bulk elevators and conveyers. A gear, transmission or the like may or may not be used for increased efficiency or controllability.

The camera may be replaced with any device capable of making a digital representation of an object placed on the conveying surface. Such device may e.g. be a device detecting and possibly transmitting electromagnetic waves such as e.g. visual light, ultraviolet light, infrared light, radar waves or microwaves. Other alternative devices may use ultrasound or the like for making the digital representation.

The knife arrangements may be replaced with any similar separation device such as a saw, a pair of scissors or a water jet.

The systems and methods described above is preferably used together with fish belonging to the sardine group, such as herring, mackerel or anchovies. However, it is contemplated that the technologies described above may as well be applicable to the processing of any kind of fish or similar foodstuff.

The usage of the term downstream should be understood in relation to the conveying or transport direction of the fish.

if using a plurality of robots, the computer (not shown) also determines which specific robot will pick up a specific sardine, whereby each robot may be designated to pick up all sardines within a specific size range, or alternatively any robot may be used to pick up any sardine.

LIST OF PARTS

10. Processing plant according to a first embodiment
12. Bulk container
14. Bulk receptacle
16. Bulk elevator
18. Loading area
20. Underwater conveyor
22. Sardine (fish)
23. Head part (end waste part)
24. Gill cover
25. Pectoral fin
26. Body part
27. Tail part (end waste part)
30. Transition between head part and body part
31. Transition between tail part and body part
32. Processing plant according to a further embodiment
34. Transport band
36. Camera detection unit
38. Robot (industrial)
39. Robot arm
40. End effector
41. First knife
42. Separation arrangement
43. Second knife
44. End waste receptacle
45. Suction element
46. Waste receptacle
48. Waste object
49. Waste conveyer
50. Can
51. Slits 52. Packing conveyer
53. Compartment wall
54. Body compartment
55. End compartment
56. Evisceration station
58. Packing station
59. Container conveyer
60. Severing arm
61. Gripping unit
62. Inner plate
63. Outer plate
64. Actuator rod
65. Hose
66. Electric motor
67. Suction member
68. Lifting rod
69. Lifting actuator
70. Spindle
71. Motor The present invention is characterized by the following points:

1. A system for processing fish of a single species and of different anatomic constitution having at least an end waste part, a body part and a transition between the end waste part and the body part, the system comprising:
   a frame, defining a first end and a second end opposite the first end and including a fish loading area for receiving the fish at the first end and a fish unloading area at the second end,
   an optical measurement unit located at the first end monitoring at least part of the fish loading area for producing a digital representation of the fish,
   a grabbing unit mounted on the frame downstream in relation to the optical measurement unit between the first end and the second end for collecting the fish from the fish loading area and placing the fish on the fish unloading area,
   a processing unit for receiving the digital representation of the fish, determining the transition between the end waste part and the body part of the fish and controlling the grabbing unit, and
   a separation arrangement located at or alternatively downstream in relation to the grabbing unit for separating the end waste part from the body part at the transition.

2. The system according to point 1, wherein the fish loading area and/or the fish unloading area comprises a conveyer assembly, such as e.g. a conveyer belt.

3. The system according to points 2, wherein the conveyer assembly has a variable conveying velocity.

4. The system according to any of the points 2-3, wherein the conveyer assembly comprises a first and a second conveyer wherein the first conveyer and the second conveyer extending parallel for at least a part of the distance between the first end and the second end.

5. The system according to point 4, wherein the first conveyer and the second conveyer have an opposite conveying direction for at least a part of the distance between the first end and the second end.

6. The system according to any of the previous points, wherein the body part having a body length longer than a specific maximum length and the separation arrangement separates the body part into a first body part having a length equal to the maximum length and a second body part having a length equal to the body length of the body minus the maximum length.

7. The system according to any of the previous points, wherein the separation arrangement is fixed onto the grabbing unit.

8. The system according to any of the previous points, wherein the optical measurement unit comprises a CCD camera or alternatively a laser tracking system.

9. The system according to any of the previous points, wherein the grabbing unit comprises one or more industrial robots.

10. The system according to any of the previous points, wherein the grabbing unit comprises an electromechanical or pneumatic gripping member or alternatively a suction member for moving the fish.

11. The system according to any of the previous points, wherein the separation arrangement comprises a rotating blade or alternatively a reciprocating blade.

12. The system according to any of the previous points, further providing one or more additional processing stations such as an evisceration station or a packing station.

13. The system according to any of the previous points, further providing one or more additional unloading areas such as a reject station or a waste station for disposing the end waste part.

14. The system according to any of the previous points, wherein the processing unit includes means for determining the transition between the end waste part and the body part by measuring an overall length of the fish and calculating a fraction of the overall length corresponding to the length of the end waste part.

15. The system according to any of the previous points, wherein the processing unit is supplied with a list of size groups constituting size ranges, the fish is designated into one specific size group determined by measuring an overall length of the fish and the transition between the end waste part and the body part is determined by the size group.

16. The system according to any of the previous claims, further including a packing station, the packing station providing a multitude of containers for receiving the fish, the multitude of containers are designated different size ranges, the fish is packed in the corresponding container according to the size of the fish, which is derived from the digital representation.

17. The system according to any of the previous points, wherein the end waste part comprises a head part, i.e. the head and the gills of the fish.

18. The system according to any of the previous points, wherein the processing unit includes means for determining the transition between the head part and the body part by the position of the gill cover or alternatively the position of the pectoral fin or alternatively by the surface area of the fish or alternatively by the circumference of the fish or alternatively by the colour of the fish or alternatively by the length of the fish or alternatively by the contour/outer periphery of the fish.

19. The system according to any previous points, wherein the end waste part comprising the tail part of the fish.

20. The system according to any of the previous points, wherein the processing unit includes means for determining the transition between the tail part and the body part by the position of the thinnest part of the fish.

21. A processing station for processing fish of a single species and of different anatomic constitution having at least an end waste part, a body part and a transition between the end waste part and the body part, the processing station constituting a combined grabbing unit, separation unit and evisceration unit where:
   the grabbing unit comprising a first surface and an opposite located second surface, the first and second surfaces being movable relative to one another, the first and second surfaces defining a enclosure for accommodating the fish body, the enclosure having an open end for exposing the transition between the end waste part and the body part, the separation unit being located at the open end of the enclosure and comprising a set of separating elements, the set of separating elements defining an open position defining a distance between the set of separating elements for accommodating the transition, and a closed position where the set of separating elements is severing the transition, and the evisceration unit comprising a suction unit for subjecting the transition to a low pressure, the evisceration unit having an active position where the suction unit is positioned juxtaposed the open end, and a passive position where the suction unit is positioned remote from the open end.

22. The processing station according to point 21, wherein the suction unit is mounted on the set of separating elements and where the open position corresponds to the passive position and the closed position corresponds to the active position.

23. The processing station according to any of the points 21-22, wherein the first and second surfaces are undulated.

24. A method for processing fish of a single species and of different anatomic constitution having at least an end waste part, a body part and a transition between the end waste part and the body part, the method comprising:

providing a frame, defining a first end and a second end opposite the first end and including a fish loading area at the first end and a fish unloading area at the second end, providing an optical measurement unit located at the first end monitoring at least part of the fish loading area for producing a digital representation of the fish, providing a grabbing unit mounted on the frame downstream in relation to the optical measurement unit between the first end and the second end for collecting the fish from the fish loading area and placing the fish on the fish unloading area, providing a processing unit for receiving the digital representation of the fish and controlling the grabbing unit, and providing a separation arrangement located at or downstream in relation to the grabbing unit for separating the end waste part from the body part at the transition, processing the fish by performing the following steps:
placing the fish on the fish loading area,
determining the transition between the end waste part and the body part of the fish by using the processing unit,
collecting the fish by using the grabbing unit controlled by the processing unit, and
separating the end waste part from the body part at the transition.

25. The method according to point 24, further comprising any of the features of points 1-20.

26. A processing method for processing fish of a single species and of different anatomic constitution having at least an end waste part, a body part and a transition between the end waste part and the body part, the processing method comprise providing a processing station constituting a combined grabbing unit, separation unit and evisceration unit where:

the grabbing unit comprising a first surface and an opposite located second surface, the first and second surfaces being movable relative to one another, the first and second surfaces defining an enclosure and the enclosure having an open end, the separation unit being located at the open end of the enclosure and comprising a set of separating elements, the set of separating elements defining an open position defining a distance between the set of separating elements for accommodating the transition, and a closed position where the set of separating elements are severing the transition, and the evisceration unit comprising a suction unit and having an active position where the suction unit is positioned juxtaposed the open end, and a passive position where the suction unit is positioned remote from the open end, the processing method further comprise the steps of:

accommodating the fish body in the enclosure defined between the first and second surfaces and exposing the transition between the end waste part and the body part at the open end of the enclosure while having the separation unit in the open position and the evisceration unit in the passive position, and Severing and eviscerating the fish by moving the mobile knife to the closed position and subsequently, or alternatively simultaneously, moving the evisceration unit to the active position and subjecting the transition to a low pressure.

27. The method according to point 26, further comprising any of the features of points 22-23.

The invention claimed is:

1. A system for processing fish of a single species and of different anatomic constitution having at least an end waste part, a body part and a transition between said end waste part and said body part, said system comprising:

a frame, defining a first end and a second end opposite said first end and including a fish loading area configured for receiving said fish at said first end and a fish unloading area at said second end;

an optical measurement unit located at said first end and configured for monitoring at least part of said fish loading area for producing a digital representation of said fish;

a grabbing unit mounted on said frame downstream in relation to said optical measurement unit between said first end and said second end and operable for collecting said fish from said fish loading area and placing said fish on said fish unloading area;

a processing unit for configured for receiving said digital representation of said fish, determining said transition between said end waste part and said body part of said fish and controlling said grabbing unit; and a separation arrangement located in relation to said grabbing unit so as to be operable for separating said end waste part from said body part at said transition.

2. The system according to claim 1, wherein at least one of said fish loading area and said fish unloading area comprises a conveyer assembly.

3. The system according to claim 2, wherein said conveyer assembly has a variable conveying velocity.

4. The system according to claim 2, wherein said conveyer assembly comprises a first conveyor and a second conveyer, wherein said first conveyer and said second conveyer extend parallel to each other for at least a part of the distance between said first end and said second end.

5. The system according to claim 4, wherein said first conveyer and said second conveyer have an opposite conveying direction for at least a part of the distance between said first end and said second end.

6. The system according to claim 1, wherein said separation arrangement is fixed onto said grabbing unit.

7. The system according to claim 1 wherein said processing unit is supplied with a list of size groups constituting size ranges, said fish is designated into one specific size group determined by measuring an overall length of said fish and said transition between said end waste part and said body part is determined by said size group.

8. The system according to claim 1 wherein said processing unit includes means for determining said transition between said head part and said body part by a body characteristic selected from the group consisting of the position of the gill cover, the position of the pectoral fin, the surface area of said fish, the circumference of said fish, the colour of said fish, the length of said fish, and the contour of the outer periphery of said fish.

9. The system according to claim 1, further including a packing station, said packing station providing a multitude of containers for receiving said fish, wherein said multitude of containers are designated different size ranges, said fish is packed in the corresponding container according to the size of said fish, which is derived from said digital representation.

10. A processing station for processing fish of a single species and of different anatomic constitution having at least an end waste part, a body part and a transition between said end waste part and said body part, said processing station constituting a combined grabbing unit, separation unit and evisceration unit, characterized by:
said grabbing unit comprising a first surface and an opposite located second surface, said first and second surfaces being movable relative to one another, said first and second surfaces defining an enclosure for accommodating said fish body, said enclosure having an open end for exposing said transition between said end waste part and said body part;
said separation unit being located at said open end of said enclosure and comprising a set of separating elements, said set of separating elements defining an open position defining a distance between said set of separating elements for accommodating said transition, and a closed position where said set of separating elements is severing said transition; and
said evisceration unit comprising a suction unit for subjecting said transition to a low pressure, said evisceration unit having an active position where said suction unit is positioned juxtaposed said open end, and a passive position where said suction unit is positioned remote from said open end.

11. The processing station according to claim 10, wherein said suction unit is mounted on said set of separating elements and wherein said open position corresponds to said passive position and said closed position corresponds to said active position.

12. The processing station according to claim 10, wherein said first and second surfaces are undulated.

13. A method for processing fish of a single species and of different anatomic constitution having at least an end waste part, a body part and a transition between said end waste part and said body part, said method comprising:
providing a frame, defining a first end and a second end opposite said first end and including a fish loading area at said first end and a fish unloading area at said second end;
providing an optical measurement unit located at said first end monitoring at least part of said fish loading area for producing a digital representation of said fish;
providing a grabbing unit mounted on said frame downstream in relation to said optical measurement unit between said first end and said second end for collecting said fish from said fish loading area and placing said fish on said fish unloading area;
providing a processing unit for receiving said digital representation of said fish and controlling said grabbing unit; and
providing a separation arrangement located in relation to said grabbing unit so as to be operable for separating said end waste part from said body part at said transition;
placing said fish on said fish loading area;
determining said transition between said end waste part and said body part of said fish by using said processing unit;
collecting said fish by using said grabbing unit controlled by said processing unit; and
separating said end waste part from said body part at said transition.

14. A processing method for processing fish of a single species and of different anatomic constitution having at least an end waste part, a body part and a transition between said end waste part and said body part, said processing method comprise providing a processing station constituting a combined grabbing unit, separation unit and evisceration unit, characterized by:
said grabbing unit comprising a first surface and an opposite located second surface, said first and second surfaces being movable relative to one another, said first and second surfaces defining an enclosure and said enclosure having an open end;
said separation unit being located at said open end of said enclosure and comprising a set of separating elements, said set of separating elements defining an open position defining a distance between said set of separating elements for accommodating said transition, and a closed position where said set of separating elements is severing said transition; and
said evisceration unit comprising a suction unit and having an active position where said suction unit is positioned juxtaposed said open end, and a passive position where said suction unit is positioned remote from said open end;
said processing method further comprising the steps of:
accommodating said fish body in said enclosure defined between said first and second surfaces and exposing said transition between said end waste part and said body part at said open end of said enclosure while having said separation unit in said open position and said evisceration unit in said passive position; and
severing and eviscerating said fish by moving said separating element to said closed position and moving said evisceration unit to said active position and subjecting said transition to a low pressure.

* * * * *